Patented Oct. 16, 1934

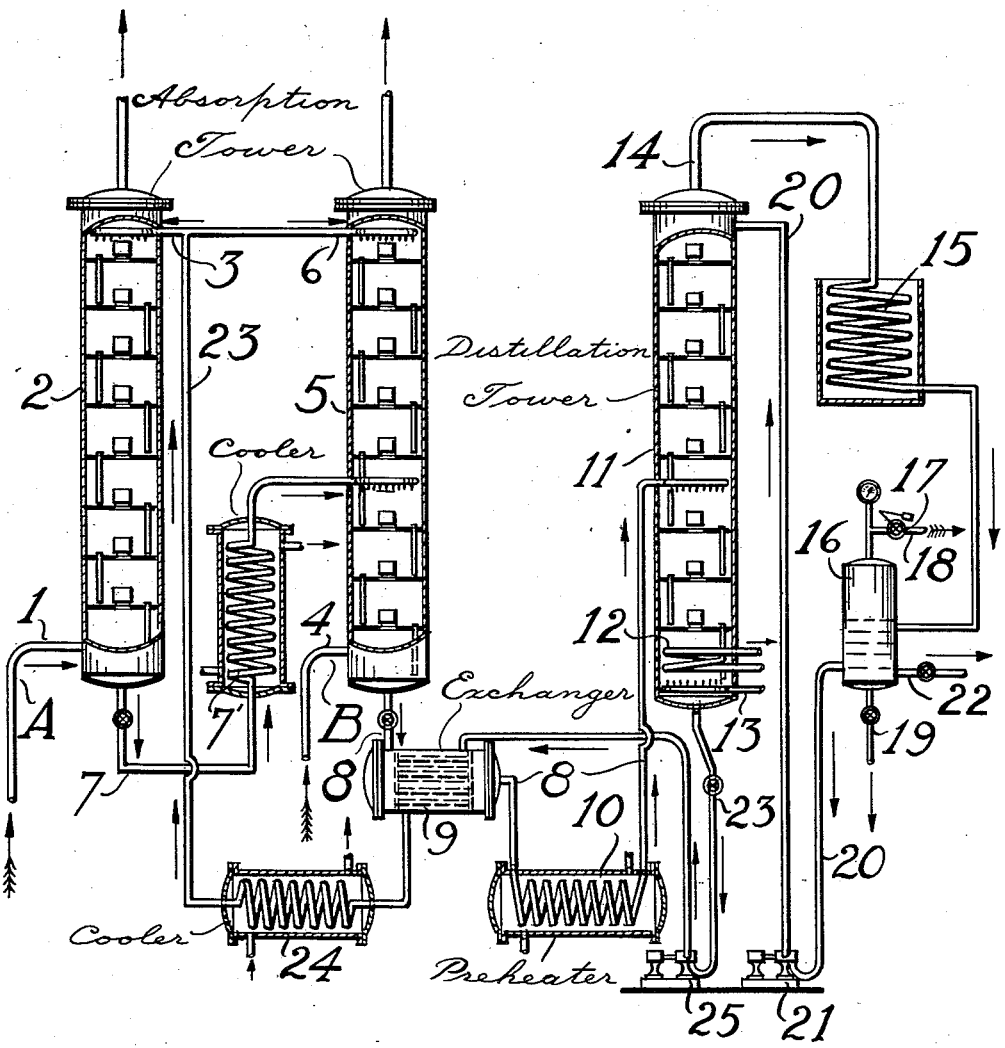

1,976,802

UNITED STATES PATENT OFFICE 1,976,802

OIL ABSORPTION PROCESS

Henry Janney Nichols, Jr., Scotch Plains Township, Union County, and Paul E. Kuhl, Elizabeth, N. J., assignors to Standard Oil Development Company, a corporation of Delaware Application October 17, 1931, Serial No. 569,392

8 Claims. (Cl. 183—114.6)

This invention relates to the recovery of hydrocarbon vapors from gases by oil absorption and more especially to a novel method for securing economies in the total circulation of oil in scrubbing a plurality of gaseous mixtures containing varying proportions of the hydrocarbons it is desired to recover.

In the usual oil absorption gasoline recovery plant, absorption oil is circulated in a bubble cap tower or similar contact means countercurrent to a stream of gas, which, as it enters the tower, contains hydrocarbons in the boiling range of gasoline, i. e., butane and heavier, which it is the function of the absorption oil to absorb. If several different gases are to be processed each is usually treated independently.

In a sufficiently long absorption column the key component in the oil leaving the bottom of the column is in substantial equilibrium with the key component in the entering gas—the key component being the most volatile component which it is desired to remove in quantity, usually the butane hydrocarbons. In other words, the partial pressure of the butane in the rich oil is nearly as great as the partial pressure of the butane in the entering gas. Usually the partial pressure of the next highest boiling component, in this example, pentane hydrocarbons, in the rich oil will be much less than the partial pressure of that component in the entering gas, due to an insufficient amount of the higher boiling component in the inlet gas to give a concentration in the rich oil which will produce a partial pressure near that in the inlet gas.

If, therefore, two or more gases are to be processed, in which the partial pressures of the lowest boiling component which it is desired to remove, differ, the rich oil in substantial equilibrium with the gas having the lowest partial pressure of this component, say butane, would absorb still more butane if brought in contact with a gas having a higher partial pressure of butane.

According to our invention, in a case such as outlined above, the rich oil from the absorber processing the gas having the least partial pressure of butane is introduced into the mid-section of the absorber processing the gas having the next higher partial pressure of butane and this procedure may be followed successively with gases of higher partial pressure of butane. According to this procedure, it is possible to use a smaller amount of lean or fresh absorption oil than would be required if the gases were scrubbed independently, in the top of each absorber other than the first.

The rich oil may be cooled before introducing it into the next absorber in order to remove the heat of absorption and a further economy in fresh absorption oil is then effected.

Our invention may also be applied to the absorption of hydrocarbons from two or more gas mixtures when for some reason it is desirable to completely remove some particular hydrocarbon from one gas mixture, and only the less volatile hydrocarbons from the other gases. It is understood that it is not desired to recover from the absorption menstruum all of the more volatile hydrocarbon removed from the first gas.

A specific application is as follows: In a specific conventional oil absorption gasoline recovery plant, it has been found to be desirable to remove substantially all of the butane and heavier hydrocarbons from one gaseous mixture and all of the pentane and heavier from another gaseous mixture, but it is not required to recover all of the butane from the menstruum contacted with the first mentioned gas.

It is necessary to supply to the absorber processing the gas from which it is desired to remove all of the butane a much greater quantity of absorption oil than would be required to remove all of the pentane. If, therefore, it is found that the partial pressure of pentane in the gas entering the second absorber, from which it is desired to remove completely only the pentane and heavier hydrocarbons, is higher than the partial pressure of pentane in the fat oil leaving the first absorber, this fat oil may be introduced at a mid-point of the second absorber and serves to help absorb the pentane from the second gas. In this way, less fresh absorption oil will be required in the second absorber and consequently, less total oil will be necessary than would have been required if the absorbers were operated independently.

The drawing is a diagrammatic sketch in sectional elevation of one type of apparatus suitable for an application of our process but it is understood that this apparatus is merely shown for purposes of illustration and that our process is not to be limited thereto. Referring to the drawing, a gas A from which it is desired to remove all of the butane and heavier hydrocarbons is passed by line 1 through absorption tower 2, countercurrent to a stream of lean absorption oil admitted by line 3 into the top of the tower. The ratio of oil to gas used is dependent upon the temperature, pressure and efficiency of the tower as well as the composition of oil and gas, all of which may be readily determined and the ratio fixed by one familiar with the oil absorption art.

A second gas B from which it is desired to remove substantially completely only the pentane and heavier hydrocarbons is passed by line 4 through absorber 5 countercurrent to a stream of lean absorption oil admitted to the tower by line 6. The fat oil leaving the bottom of tower 2 and being substantially saturated with butane with respect to gas A and lighter hydrocarbons but only incompletely saturated with pentane and heavier hydrocarbons is passed by line 7 preferably through cooler 7' where the heat of absorption is removed, into the mid-section of tower 5. This oil is then mixed in tower 5 with the lean oil admitted by line 6 and the fat oil leaving tower 5 by line 8 comprises the total lean oil supplied to both towers. This oil is passed through suitable distillation equipment for the separation of the absorbed hydrocarbons from the absorption oil. For example, the oil may be passed through heat exchanger 9 and preheater 10 into the mid-section of a distillation column 11. This column is heated at the bottom by a heating coil 12 and the stripping is aided by admitting live steam or other inert gas into the bottom of the tower by line 13. The vaporized hydrocarbons are withdrawn from the top of tower 11 by line 14 and are passed through cooler 15 into separator 16 which may be maintained at any desired pressure. Uncondensed gases are removed from this separator by pressure control valve 17 in gas release line 18. The uncondensed gases may be passed through a reabsorber or recompressor or may be blended with either gas A or B and repassed through the absorbers for the recovery of the more valuable heavier hydrocarbons. Water is withdrawn from separator vessel 16 by line 19 and condensed absorption naphtha is recycled by line 20 and pump 21 to the top of tower 11 for reflux. Absorption naphtha is also withdrawn from separator 16 by line 22 to storage, not shown. This naphtha may be blended with heavier gasolines with or without additional rectification to remove the undesirable highly volatile compounds such as propane and lighter hydrocarbons, or it may be fractionated into various cuts for use as solvents or liquid and gaseous fuels, as will be understood. The hot stripped absorption oil is withdrawn from the bottom of tower 11 by line 23 and is passed through heat exchanger 9 and cooler 24 by pump 25. Cold lean absorption oil is then split into two streams which are repassed to the towers through lines 3 and 6, as already described.

As an example of our process, a gas A containing 53.5% of methane and other fixed gases, 22.2% ethane, 15.9% propane, 6.3% butane, 2.1% pentane, is scrubbed under seventy pounds pressure with a lean absorption oil of 34° A. P. I. and an average molecular weight of about 188. The oil is passed into the tower at a temperature of 87° F. and 48 gallons of lean oil are supplied to the tower per 1,000 cubic feet of inlet gas. 98% of the butane initially in the gas is removed in this tower in the fat absorption oil with substantially 100% of the pentane and the heavier hydrocarbons originally in the gas.

A second gas B containing 37.2% methane and other fixed gases, 24.7% ethane, 20.5% propane, 11.3% butane and 6.3% pentane and heavier hydrocarbons is scrubbed at 70 pounds pressure in a second tower with a lean absorption oil similar to that used in the first tower but cooled to 83° F. In order to obtain substantially 100% pentane recovery from the gas in this tower it is necessary to supply 29 gallons of lean oil per 1,000 cubic feet of inlet gas. However, using our invention in an example where the volume of gas B is four times that of gas A and all of the fat oil contacted with gas A is supplied without cooling to the mid-section of the absorption tower used for gas B, it is necessary to supply only 22 gallons of lean oil to the top of this tower to obtain substantially 100% recovery of pentane and heavier hydrocarbons from gas B. This represents a savings of 7 gallons of lean oil per 1,000 cubic feet of gas B scrubbed, which permits corresponding economies in the cost of recovery of the absorbed hydrocarbons from the smaller volume of fat oil. The rectification of the absorption naphtha is also simplified since there is a selective displacement of propane and lighter hydrocarbons in the second tower from the previously saturated oil supplied to its mid-section.

It is understood that where the terms ethane, propane, butane and pentane have been used herein these may be considered to represent the complex mixture of hydrocarbons such as saturated, cyclic, unsaturated and isomeric, occurring in natural and refinery gases as well as the normal paraffin hydrocarbons themselves. While our process has been described particularly as applied to recovery of butane and pentane respectively from gases, it may be used generally for removing any desired group of hydrocarbons from a plurality of gas mixtures differing in the partial pressure of the most volatile hydrocarbons it is desired to remove. In all such cases we pass the absorption oil in countercurrent contact successively with the gases in the order of increasing partial pressure of the desired hydrocarbon in each gas.

Our invention is not to be limited to any particular groups of hydrocarbons, nor to any examples given herein for purposes of illustration but only by the following claims in which we wish to claim all novelty so far as the prior art permits.

We claim:

1. A process for recovery of pentane from a plurality of gas mixtures differing in partial pressure of pentane which comprises passing an absorption oil in countercurrent contact successively with the gases in the order of increasing partial pressure of pentane, and passing each gas except the first, after contact with the said absorption oil, in countercurrent contact with a lean absorption oil to remove the remaining pentane substantially completely.

2. A process for recovery of pentane from two gas mixtures containing different partial pressures of pentane comprising passing the gases separately through two absorbers, passing a lean absorption oil into the top of each absorber, withdrawing the fat oil from the bottom of the absorber operating on the gas of the lower partial pressure of pentane, passing said oil into the mid-section of the absorber operating on the second gas, withdrawing the total saturated oil from the second absorber, stripping it of absorbed hydrocarbons, and returning it to the two absorbers in a cyclic operation.

3. A process for removing hydrocarbons from separate gas mixtures comprising passing an absorption oil through an absorber in countercurrent contact with a gas in proper proportion to remove substantially all of a given hydrocarbon from said gas, and then passing this fat oil into the mid-section of a second absorber in countercurrent contact with a second gas which has not passed through the first absorber, to absorb an additional amount of a less volatile hydrocarbon.

4. A process for removing hydrocarbons from gases comprising passing an absorption oil through an absorber in countercurrent contact with a gas in proper proportion to remove substantially all the butane from said gas, and then passing this oil into the mid-section of a second absorber operating on a gas containing a higher partial pressure of pentane than that in the oil, adding additional lean oil at the top of the second absorber in proper proportion to remove the pentane substantially completely from the second gas, withdrawing fat oil from the second absorber, stripping it of absorbed hydrocarbons, and returning it to the two absorbers in a cyclic operation.

5. The method of recovering gasoline from two gases of different composition containing gasoline by countercurrent treatment with an absorptive oil, which comprises circulating a portion of the oil countercurrently to the gas having the lowest gasoline concentration whereby the oil becomes only partially saturated, passing the partially saturated oil countercurrently to the gas richest in gasoline content to remove a portion of the gasoline from the rich gas, and stripping the rich gas by countercurrent contact with a fresh absorptive oil.

6. A process for removing hydrocarbons from a plurality of gas mixtures differing in partial pressure of the most volatile hydrocarbon it is desired to remove, which comprises passing an absorptive liquid in absorptive contact successively with each gas mixture independently, the gas mixtures being in the order of increasing partial pressure of the said hydrocarbon, the absorption oil having contact with the first gas mixture being only partially saturated, and passing each gas mixture excepting the first in countercurrent contact with additional lean absorption oil subsequent to the contact with the partially saturated oil.

7. A process for removing hydrocarbons from a plurality of separate gas mixtures comprising passing an absorptive liquid in absorptive contact successively with each gas mixture independently, the gas mixtures being in the order of decreasing volatility of the most volatile hydrocarbon it is desired to remove substantially completely from each gas mixture, the absorption oil after contact with the first gas mixture being only partially saturated, and contacting additional lean absorption oil with each gas excepting the first subsequent to its contact with the partially saturated absorption oil.

8. A process for removing a hydrocarbon from a plurality of gas mixtures containing the same at different partial pressures, comprising passing an absorption oil in contact with one of said gas mixtures to charge the oil incompletely with respect to the most volatile hydrocarbon it is desired to remove from said gas mixture, then passing such incompletely charged oil into another absorption zone and there contacting it with another of said gas mixtures containing said hydrocarbon at a partial pressure higher than the pressure of said hydrocarbon in the incompletely charged oil to remove from said last mentioned gas mixture a part at least of said hydrocarbon, maintaining the gas mixtures out of communication with each other, and passing additional lean oil in countercurrent contact with the gas mixture which is passed through the latter absorption stage.

H. JANNEY NICHOLS, Jr.
PAUL E. KUHL.